United States Patent [19]

Knaus

[11] Patent Number: 4,919,864
[45] Date of Patent: Apr. 24, 1990

[54] METHOD FOR MAKING MULTICOLORED FOAM

[75] Inventor: Dennis A. Knaus, West Barnstaple, Mass.

[73] Assignee: Packaging Industries Group, Inc., Hyannis, Mass.

[21] Appl. No.: 162,792

[22] Filed: Feb. 26, 1988

[51] Int. Cl.$^5$ ............................................. B29C 47/04
[52] U.S. Cl. .................... 264/45.9; 264/146; 264/245
[58] Field of Search .................. 428/316.6; 264/45.9, 264/75, 245, 146

[56] References Cited

U.S. PATENT DOCUMENTS

| | | | |
|---|---|---|---|
| 3,972,970 | 8/1976 | Taylor | 264/50 |
| 4,048,101 | 9/1977 | Nakamachi et al. | 264/75 |
| 4,181,647 | 1/1980 | Beach | 264/50 |
| 4,182,734 | 1/1980 | Takano et al. | 264/50 |
| 4,248,824 | 2/1981 | Hattop | 264/245 |

FOREIGN PATENT DOCUMENTS

| | | | |
|---|---|---|---|
| 3538116 | 4/1987 | Fed. Rep. of Germany | 264/75 |
| 47-043186 | 10/1972 | Japan | 264/45.9 |
| 51-047747 | 12/1976 | Japan | 264/75 |
| 53-002904 | 2/1978 | Japan | 264/45.9 |

Primary Examiner—Jan H. Silbaugh
Assistant Examiner—Allan R. Kuhns
Attorney, Agent, or Firm—Berman, Aisenberg & Platt

[57] ABSTRACT

A method and apparatus for the preparation of multicolor, multidensity and/or multithermoplastic foam and products composed thereof. Heat-plastified foamable gels of a thermoplastic resin or resins containing blowing agents are combined and extruded simultaneously through the same orifice of a die and expanded into a foam.

The color, density and/or thermoplastic resin of the secondary foamed gel or gels can form a multitude of patterns or shapes that include waves, diagonals, stripes and/or continuous coverage over the entire surface of the primary foamed gel. These patterns or shapes can be on the surface and/or within the cross-section of the primary foamed gel.

4 Claims, 3 Drawing Sheets

METHOD FOR MAKING MULTICOLORED FOAM

FIELD OF THE INVENTION

This invention relates generally to a method for the manufacture of thermoplastic foams and the product thereof and more particularly to extrusion of thermoplastic foams having at least a multiple combination of foams of different colors, densities and/or thermoplastic materials.

BACKGROUND OF THE INVENTION

Foams of thermoplastic resins, such as, for example, polystyrene and polyethylene, are useful industrial products because of their excellent heat insulating, cushioning and other properties. These foams have found acceptance over the years in such applications as thermal insulation and cushioning and as raw materials for the fabrication of various shaped articles.

The preparation of thermoplastic foams by extruding a heat-plastified mixture of thermoplastic resin and a blowing agent is well known in the art and is described in U.S. Pat. Nos. 2,740,157; 3,067,147; 3,413,387; 3,413,388; 3,431,163; 3,431,164; 3,954,929; and 3,966,381, and Canadian Patent No. 451,864, as well as in other literature pertaining to the art.

U.S. Pat. No. 2,450,436 discloses a method for the preparation of cellular thermoplastic products in which a solid thermoplastic resin, e.g., polystyrene, and a normally gaseous agent such methyl chloride, methyl ether, propylene or butylene are held in a closed vessel under pressure at a temperature below the critical temperature of the normally gaseous agent until a homogeneous mobile gel is obtained. Thereafter, an outlet is opened to permit flow of the gel from the vessel. During flow of the mobile gel from the pressurized vessel into a zone of lower pressure, the resin is swollen by vaporization and expansion of the dissolved volatile substance to form a stable cellular product consisting for the most part of individual thin-walled closed cells.

U.S. Pat. No. 2,515,250 describes a method of forming a mixture of a normally gaseous agent and a thermoplastic resin under pressure, and storing the mixture by feeding it into a pressurized storage vessel in which it is maintained at a desired temperature until a homogeneous mobile gel or solution is obtained prior to extrusion and expansion of the resin.

U.S. Pat. No. 3,067,147 discloses a method for the preparation of a cellular mass from thermoplastic resins by incorporating in the material to be foamed a gas or volatile organic liquid with a thermoplastic resin, the latter then being heated to a temperature at which it becomes plastic, whereby vapors of gas or volatile liquid expand the softened resin to form a cellular mass.

U.S. Pat. No. 2,387,730 teaches the making of cellular polyethylene by impregnating a molten polymer with a gas which is soluble therein under pressure, then partially releasing the pressure while maintaining the temperature, to expand the polymer, and then cooling the expanded polymer.

U.S. Pat. No. 2,174,779 to Delorme describes apparatus for extruding various colored plastics in which a predetermined design is obtainable by feeding different colors of plastic material through an extruder. Foamed materials are not disclosed.

The patent to Wiley, U.S. Pat. No. 3,769,380, also describes a method for extruding synthetic thermoplastic sheet material having a variegated colored pattern. The method describes means for obtaining a variegated pattern, advantageously a wood-grain pattern, in the formation of non-foamed multicolored plastics.

Randall, U.S. Pat. No. 4,011,292, describes a method for producing sheet material with a multicolor striated pattern and Wissinger, U.S. Pat. No. 4,128,386, describes an apparatus for the extrusion of patterned sheets or panels of thermoplastic synthetic resin compositions. Neither of these two patents describes a method for making multicolored foam materials.

In order to obtain multicolored or multidensity foams, it has previously been necessary to laminate together sections of foams of different colors and/or densities. This additional procedure adds labor, and therefore costs, to the product and, moreover, results in a non-continuous interface between the various colors and/or types of foam with resultant poor aesthetic qualities and structural weaknesses if proper bonding does not occur.

SUMMARY OF THE INVENTION

This invention relates to a method for manufacturing thermoplastic foam and articles made therefrom having a composite structure made up of more than one color, density and/or thermoplastic material. Foams produced in accordance with this invention generally have improved esthetics, strength and durability. Because the new thermoplastic foams are produced in a single operation their costs are substantially less than those made by a secondary lamination process.

These benefits and other advantages are achieved by the preparation of a multiple material, composite thermoplastic foam, extruded in a continuous manner wherein the foams pass through a heated pliable state to a cooled set state during preparation. At least two types of heat-plastified foamable gels are combined and simultaneously extruded through the same die orifice.

The color, density and/or thermoplastic resin of the secondary foamed gel or gels can have a multitude of patterns or shapes that include waves, diagonals, stripes and/or continuous coverage over the entire surface of the primary foamed gel. These patterns or shapes can be on the surface and/or within the cross-section of the primary foamed gel.

Various combinations of foams are possible such as multiple colors, densities, and/or thermoplastic materials and these may be produced in sheet, rod, tubular, plank or other forms. These products may be modified further by cutting, laminating or stacking.

It is an object of the invention to provide a multicolored foam product in a single extrusion.

It is another object of the invention to provide a method for extruding a multicolored foam product.

DETAILED DESCRIPTION OF THE INVENTION

Figure 2:
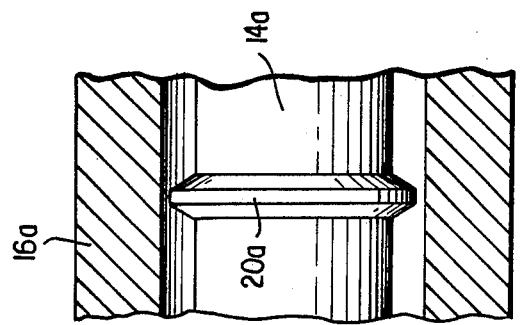
FIG. 2 is a detail of a sealing blister used in the apparatus of FIG. 1.

Although any extrudable, foamable composition of synthetic resinous material may be used, a normally solid thermoplastic polymer resin is preferred. Exemplary preferred polymers include the organic addition polymers of the following monomers:

Aliphatic α-monoolefins, such as ethylene, propylene, n-butene and isobutene; vinyl halides, such as vinyl chloride and vinylidene chloride; esters of α-ethylenically unsaturated carboxylic acids such as ethyl acrylate, methylmethacrylate, and diethyl maleate; vinyl esters, such as vinyl acetate; monovinylidene aromatic carbocyclic monomers, such as styrene; α-methyl styrene, ar-chlorostyrene, and ar(t-butyl)-styrene; α, β-ethylenically unsaturated carboxylic acids, such as acrylic acid, methacrylic acid, itaconic acid and fumaric acids. Also included are copolymers of the above-named monomers, such as ethylene/propylene copolymers, ethylene/vinyl acetate copolymers, ethylene/acrylic copolymers and the like. Also suitable are the cellulosic polymers such as methyl cellulose and ethyl cellulose; polyamides, such as nylon; polyesters, such as polyethylene terephthalate, polycarbonates and the like. Blends of the above-named polymers and copolymers are also included; especially preferred thermoplastic polymers are polyethylenes, ethylene/vinyl acetate copolymers, ethylene/acrylic acid copolymers, ethylene/methyl acrylic acid copolymers, ionomer salts of such acid copolymers, polyvinyl chlorides, and polystyrenes.

The above polymers, or blends of polymers that are substantially cross-linked, should be included in this list.

There are many normally gaseous elements, compounds or mixtures thereof that can be used as a physical blowing agent to produce cellular plastic products. Among the elemental gases that might be employed with satisfactory results are nitrogen, argon, neon, and helium.

In addition, normally gaseous organic compounds may be used to expand the plastic material. Among the most important of these are the halogen derivatives of methane and ethane, which are used as refrigerants and for similar purposes, such as chlorodifluormethane, dichlorodifluoromethane, dichlorofluoromethane, difluorotetrachloroethane, dichlorotetrafluoroethane, difluorochloroethane, 1,1,-difluoroethane, ethylchloride, methyl bromide, methyl chloride, trichlorofluoromethane, octofluorocyclobutane, monochloropentafluoroethane, and the like; mixtures of any two or more of the above.

Other normally gaseous compounds that may be employed are acetylene, ammonia, butadiene, butane, butene, carbon dioxide, cyclopropane, dimethylamine, 2,2,-dimethylpropane, ethane, ethylamine, ethylene, isobutane, isobutylene, methane, monomethylamine, propane, propylene, and trimethylamine.

All of the aforementioned materials are intended to be embraced within the term normally gaseous, expanding medium, as used herein. This term is intended to mean that the expanding medium employed is a gas at the temperatures existing under the normal operating conditions of a plastic extruder. Also, when reference is made to the introduction of a normally gaseous, expanding medium or a gas into a plastic compound in an extrusion cylinder, it is to be understood that, while the material introduced is a gas at the normal operating temperature of the extruder, it may be in either the gaseous or the liquid state at the temperature and pressure at which it is introduced into the extrusion cylinder because it is easier to pump a liquid under constant pressure and volume than it is to supply a gas under constant pressure and volume.

Examples of liquids which may be used as physical blowing agents include hydrocarbons, such as pentane, hexane, heptane or octane; unsaturated hydrocarbons, such as pentene, 4-methyl pentene or hexene; petroleum ester fractions; ethers such as dethyl ether; alcohols such as methanol or ethanol; ketones such as acetone or methylethyl ketone; and halogenated hydrocarbons such as carbon tetrachloride, chloroform, ethylene dichloride, methylene chloride, or 1,1,3-trichloro-1,2,2,-trifluoroethane.

Other blowing agents that can be used, but are not as effective at producing lower densities of foam, are the chemical blowing agents that decompose at the extrusion temperature to liberate gases. The gases liberated by these blowing agents are usually nitrogen, carbon monoxide, carbon dioxide, and ammonia. Some chemical blowing agents will liberate all of the gases previously mentioned while others may only release one type of gas. Examples of chemical blowing agents include azodicarbonamide, p-toluene sulfonyl semicarbazide, p,p-oxybis benzene sulfonyl hydrazide, p-toluene sulfonyl hydrazide, dinitroso pentamethylene and the like.

Blowing agents are usually incorporated in amounts from about 0.05 to about 55 percent by weight based on the polymer. Other ingredients such as fillers, antioxidants, anti-static agents, nucleation agents and the like may also be present in the polymer gel.

Foamable compositions of the above-named polymers, blowing agents and additives are well known in the art and a representative sample of such compositions is set forth in the previously mentioned patents, the teachings of which are incorporated herein by reference.

In the practice of the present invention, thermoplastic foams having a cross-sectional area of any geometric configuration may be extruded. Indeed, the geometric configuration of the thermoplastic foam may be varied along the length of a given product.

Figure 1:
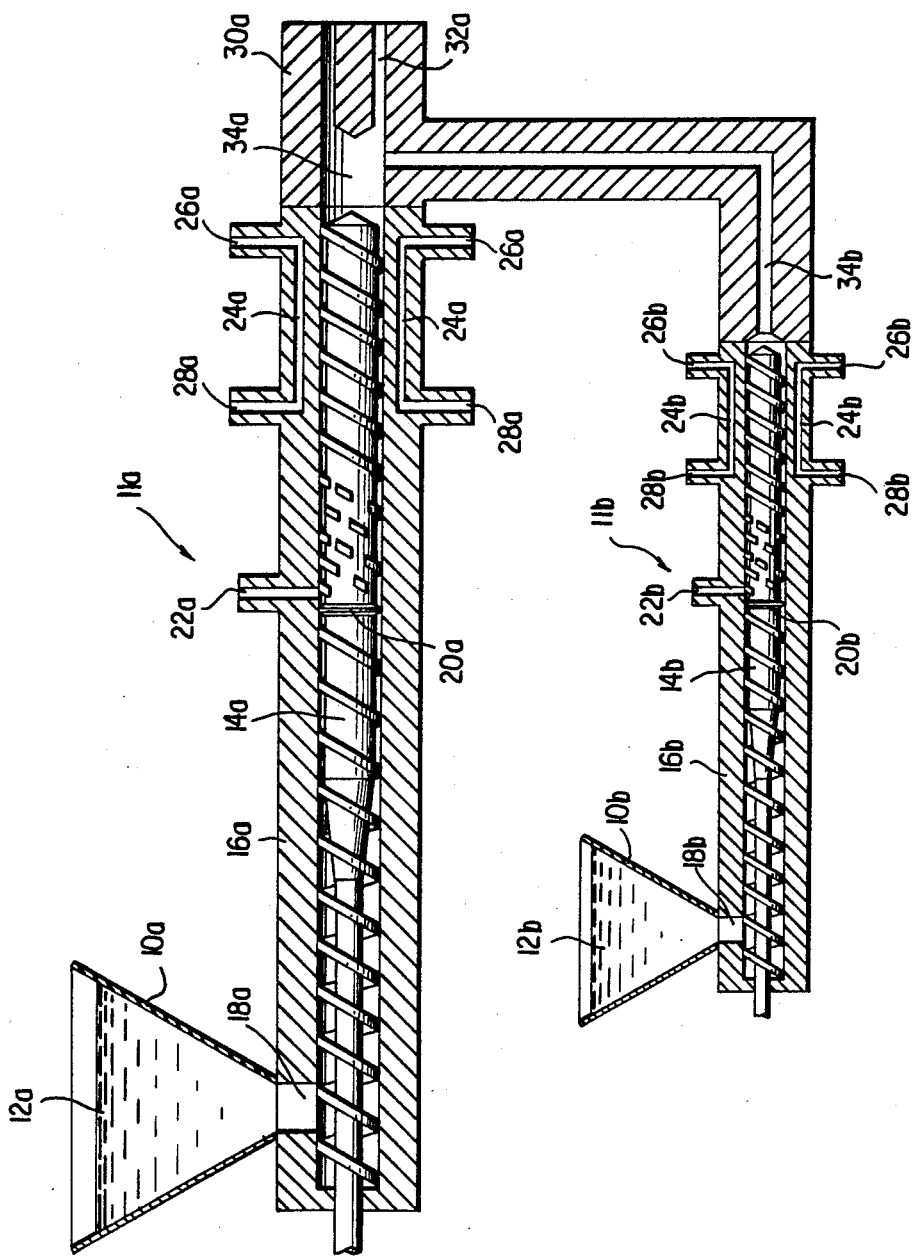
FIG. 1 is a schematic cross section of an apparatus for practicing the method of the invention.

With reference to the drawings, in which like numerals represent like parts, FIG. 1 shows two plastic extruders 11a and 11b on which hoppers 10a and 10b are mounted, where extruder 11a is the primary extruder and extruder 11b is the secondary extruder. Polymers 12a and 12b in suitable granular form are fed from hoppers 10a and 10b into the extruders where they are pressed by forward rotating screws 14a and 14b mounted for rotation in barrels 16a and 16b. At a point just to the right of the entrance of the material from the hoppers 10a and 10b, heating zones 18a and 18b are provided at which point the barrels are surrounded by conventional electric heaters with suitable temperature controls and instrumentation. After compression and melting, the molten polymers are forwarded around sealing blisters 20a and 20b, the sealing blisters forming a plastic seal against countercurrent flow of gas or vapors back through the barrels of the extruders and out of the hoppers. FIG. 2 shows a detail of a sealing blister 20a positioned around rotating screw 14a, in barrel 16a. Sealing blister 20b is similar to blister 20a.

Inlets 22a and 22b are provided for the introduction of physical blowing agents into the barrels. The blowing agents are fed under pressure through inlets 22a and 22b to form admixtures with the molten polymers in the barrels. The admixtures are mechanically agitated, thoroughly mixed, and brought to a uniform temperature throughout their masses. As a means of achieving the desired temperature control, the barrels are surrounded for a given length by passages 24a and 24b through which a heat transfer medium, such as steam, water, air, gas or oil may be circulated through entry and exit passages 26a and 28a, and 26b and 28b. The admixtures, in the form of gels, are then fed into die 30a where they are combined and extruded through die orifice 32a into a zone of lower pressure, such as the atmosphere, where the gels expand to form a cellular body.

Figure 3:
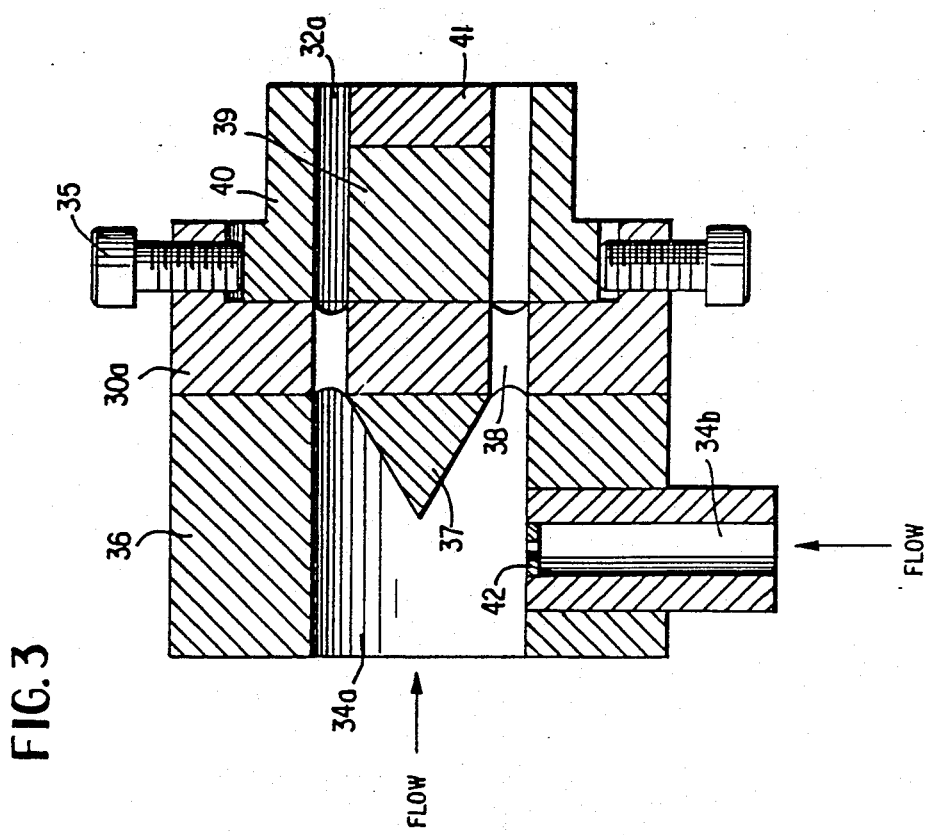
FIG. 3 is an enlarged view of an extruder used in the apparatus of FIG. 1.

FIG. 3 shows a suitable die orifice 32a, in section. Orifice 32a may be detachably held in die 30a and its concentricity is adjusted by means of screws 35. Passage 34a is in communication with extruder 11a and passage 34b, permitting entry of streams of the foamable gels from rotating screws 14a and 14b. Surrounding passageway 34a is die adapter 36, and centered in passageway 34a is spider nose 37 supported by spider 38. Extruded material flows past spider nose 37, forming a tubular flow of extrudate which flows past spider 38 and around die mandrel 39 which is surrounded by die bushing 40. Die mandrel 39 terminates in a die spreader 41, and die orifice 32a is formed between die bushing 40 and die spreader 41, thus enabling the extrudate to flow out of the apparatus through the orifice 32a.

Figure 4A:
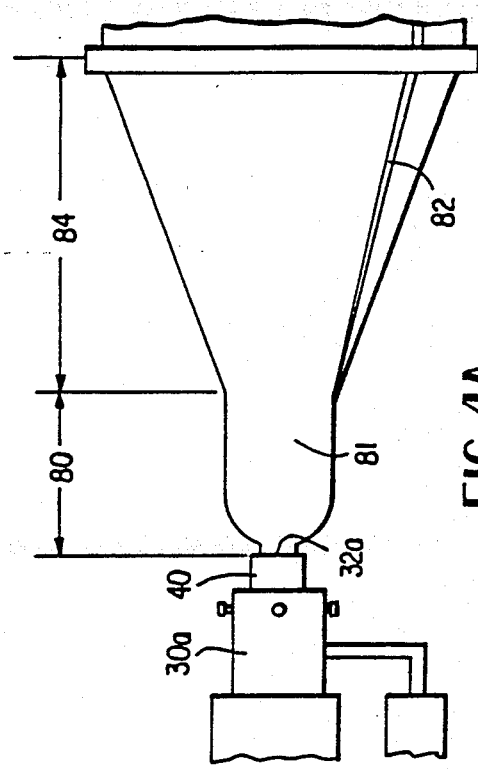
FIG. 4A is a plan view of multicolored foam as extruded from the apparatus.
Figure 4B:
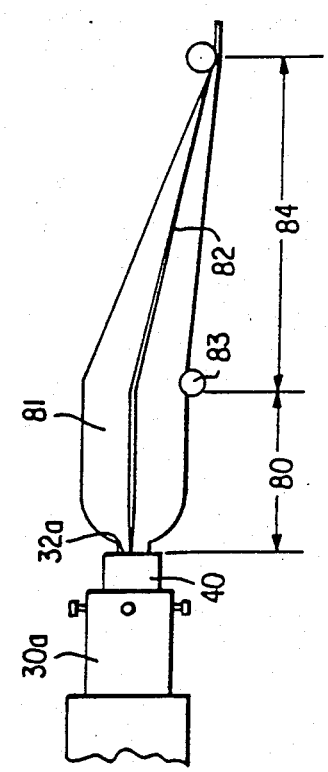
FIG. 4B is a side elevation of the extrusion of multicolored foam shown in FIG. 4A.

As the thermoplastic foam material is extruded through the annular orifice 32a, it forms a tube 80, shown in FIGS. 4A and 4B, which expands to about one to four times the diameter of the die orifice 32a. Outer surface 81 of tube 80 has a stripe 82 of foam on its surface as a result of the gel from passage 34b combining, but not mixing, with the gel from passage 34a. The shape and size of stripe 82 is determined by the shape and size of the orifices of orifice assembly 42, shown in FIG. 3, located at the entry of passage 34b into passage 34a, and by the relative flow rate of the gel in passages 34a and 34b. After the expanded and cooled, it may be slit, as shown at 83 in FIG. 4B, and opened up into a flat sheet having stripe 82 on outer surface 84.

Another method to foam the polymer is to use a chemical blowing agent introduced with the resin into one or both hoppers 10a and/or 10b of extruders 11a and/or 11b. The solid polymer and chemical blowing agent are conveyed through extruders 11a and/or 11b by feedscrews 14a and/or 14b. As the polymer and chemical blowing agent are conveyed, the polymer becomes molten and the chemical blowing agent begins to decompose and liberate gases which form an admixture with the molten polymer. The admixture is mechanically agitated, thoroughly mixed, and brought to a uniform temperature throughout its mass. Finally, the molten polymer gel is fed through inlet passages 34a and/or 34b into die 30a where it is combined with the gel from the secondary extruder and extruded through die orifice 32a into a zone of lower pressure, such as the atmosphere, where the gels expand to form a cellular body.

Figure 5:
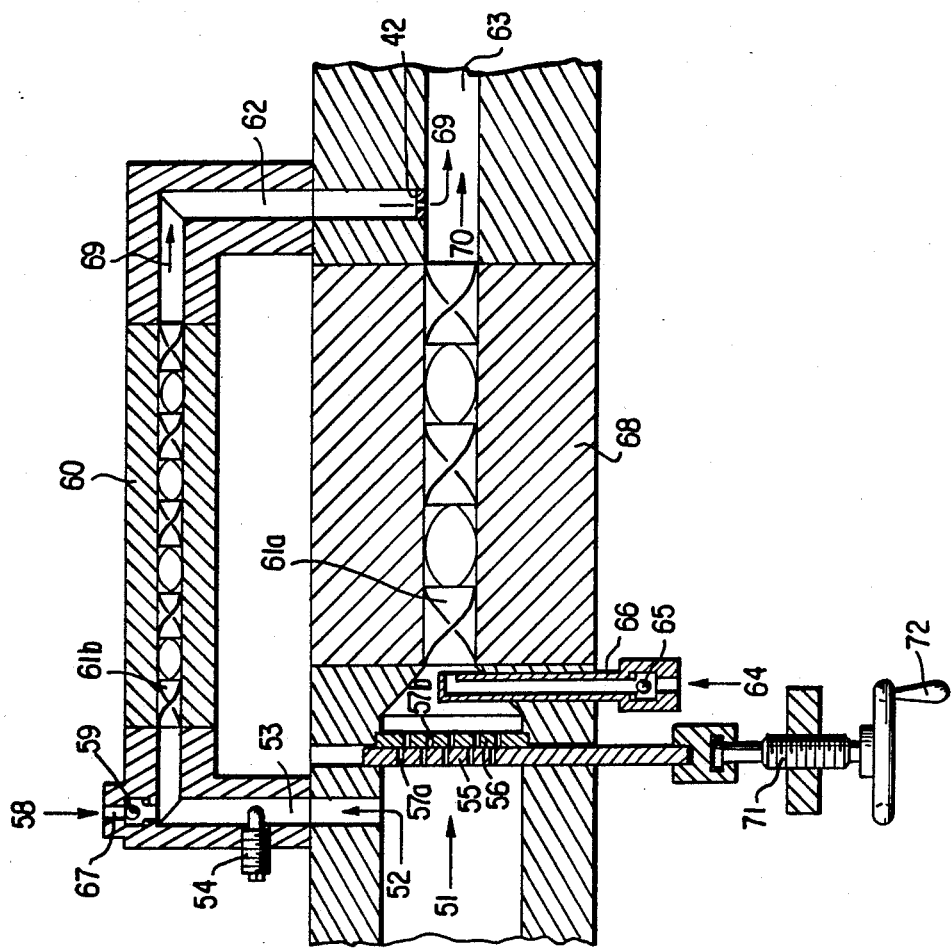
FIG. 5 is another embodiment of the apparatus of FIG. 1.

Another apparatus for producing a secondary flow of different color or density would employ the use of a flow diverter, as shown in FIG. 5. The primary molten polymer flow 51 is partially diverted to form a secondary flow 52 that passes into passage 53. The amount of secondary flow 52 can be regulated by valve 54 and the relative position of slide plate 55 to fixed plate 56. Slide plate 55 and the fixed plate 56 have a plurality of matching apertures 57a and 57b. When apertures 57a and 57b are aligned, the pressure drop created by the primary flow 51 through the plates is minimized. When handle 72 is rotated, screw assembly 71 turns and displaces or moves slide plate 55. As slide plate apertures 57a and fixed plate apertures 57b begin to misalign, the pressure drop across slide plate 55 and fixed plate 56 increases and more secondary flow 52 is diverted to passage 53. If valve 54 is closed, then less secondary flow 52 will flow into passage 53.

As the secondary flow 52 passes through passage 53 it is combined with additive flow 58. Additive flow 58 can contain a color, blowing agent and/or thermoplastic. A check valve 59 is utilized to prevent back flow of secondary flow 52 into supply line 67 for additive flow 58. Secondary flow 52 and additive flow 58 flow together, without substantial mixing, until they move into mixing section 60. Mixing section 60 contains several mixing elements 61b that have been previously described in U.S. Pat. Nos. 3,051,541; 3,051,453, 3,195,865; 3,206,170; 3,239,197; 3,286,992; 3,328,003; 3,358,749; 3,382,534; 3,394,924; 3,404,869; 3,406,947 and 3,506,204. As secondary flow 52 and additive flow 58 pass through mixing elements 61b a homogenous admixture 69 is formed, which moves through passage 62 and finally back into passage 63 with primary flow 70 leaving mixing elements 61a. As secondary flow 52 is being mixed with additive flow 58, primary flow 51 passes through slide plate apertures 57b where it may be combined with additive flow 64. Additive flow 64 may contain a different color, blowing agent and/or different thermoplastic material, or may be of different density or other property. A check valve 65 is utilized to prevent back flow of the primary flow 51 into the additive flow 64 supply line 66. Primary flow 51 and additive flow 64 flow together, without substantial mixing, until they move into mixing section 68.

Mixing section 68 contains several mixing elements 61a similar to mixing elements 61b previously described. As primary flow 51 and additive flow 64 pass through mixing elements 61a, homogenous admixture 70 is formed, which moves into passage 63 with secondary flow admixture 69. Admixtures 70 and 69 flow together, without substantial mixing, into die passage 34a, shown in FIG. 3, and are extruded through die orifice 32a into a zone of lower pressure, such as the atmosphere, where the admixture gels expand to form a cellular body.

The orifice assembly 42, shown in FIGS. 3 and 5, through which the secondary gel or gels flow to meet the primary gel may have one or more openings and may be incrementally or continuously moved or rotated to change the final shape and/or position of the secondary foamed gel on the primary foamed gel.

In a non-limiting example, orifice assembly 42 has two apertures so that two stripes of foamable material from the secondary flow are added into the primary flow. When the mixture is foamed, after leaving the extruder, the striped material becomes an integral part of the primary foamed material, advantageously forming a unitary body of striped foam and eliminating the need for a laminated joint between the primary and secondary materials. When tubular material is formed and slit to provide foam sheet material, the secondary flow forms defined stripes, waves, or other predetermined patterns on the surface of the foam sheet produced.

The nose portion 37 is preferably positioned close to the exit location of the secondary flow, as shown in FIG. 3. This insures the clearest striped pattern or other design of the second flow on the primary flow. If passage 34a (or 63) is elongated, laminar flow may distort the pattern. (Copending application Ser. No. 118,986, filed Nov. 10, 1987, describes a method of advantageously using laminar flow.

By controlling operation of the apparatus of the invention, predetermined secondary flow portions having color, density and/or thermoplastic resin different from the primary flow portions, provide a foam product having predetermined portions of different characteristics from the main body of the product.

In a similar manner, a third extruder section, similar to the second section, may be incorporated in the apparatus, joining the primary section similarly to the second section, and positioned so that the tertiary flow so produced adds a third color, density or material to the product, in a predetermined striped (or other) pattern.

While the invention has been described above with respect to certain embodiments thereof, it will be appreciated that variations and modifications may be made without departing from the spirit and scope of the invention.

What is claimed is:

1. A process for making a foam product comprising selected portions possessing different properties, said process comprising:
   passing a first foamable thermoplastic material into a first means for extruding plastic material;
   passing a second foamable thermoplastic material into a second means for extruding plastic material;
   passing said first material into a passage for conveying material to an exit orifice;
   passing said second material into said passage from at least one position at the perimeter of the passage closely adjacent said exit orifice, said second material passing onto a selected portion of a surface of said first material flowing longitudinally through the exit orifice, concurrently with said first material;
   continuously extruding said two materials in tubular form through the exit orifice concurrently without substantial mixing;
   foaming the two materials to form a tube comprising a first foamed material and a second foamed material, said second foamed material covering only said selected portion of the surface of the first foamed material, leaving substantial portions of the surface of the first foamed material uncovered; and
   slitting the tube to provide a sheet of foamed material thereby forming a predetermined pattern of second foamed material on the surface of the sheet of first foamed material;
   whereby the resulting sheet of foamed material includes defined portions of said first and second foamed materials in a predetermined pattern in which the second foamed material extends transversely over only said selected portion of the surface of the first foamed material in said predetermined pattern in the same longitudinal direction of flow as the first foamed material leaving substantial portions of the surface of said first foamed material uncovered.

2. A process of claim 1 further comprising adding a coloring material to the first foamable material and adding a coloring material of a different color to the second foamable material whereby the differently colored portions are not substantially mixed.

3. A process of claim 1 further comprising adding a different proportion of blowing agent to each of the first and second foamable plastic materials.

4. A process of claim 1 wherein the first and second thermoplastic materials have different chemical compositions.

* * * * *